an object is to be cast.) A stud 4 is supported in a hole 5 in the portion 1 of the mould, and should rest against the base 6 of the hole 5 if it is to occupy the correct position relative to the finished casting. However, as shown in the drawing, the stud 4 has become displaced away from the base of its location hole 5 and is thus not correctly located in the mould. The stud 4 is formed with a conical pip 7 which engages against the surface 8 of the portion 2 of the mould and thus prevents the end of the stud 4 engaging with that surface of the mould. The conical pip 7 is the protuberance essential to this invention. The protuberance could be made in other shapes, but in the case of a cylindrical article such as a stud which is formed by a turning operation, the conical pip is convenient as it requires no additional machining, it being only necessary to use a suitably angled parting-off tool.

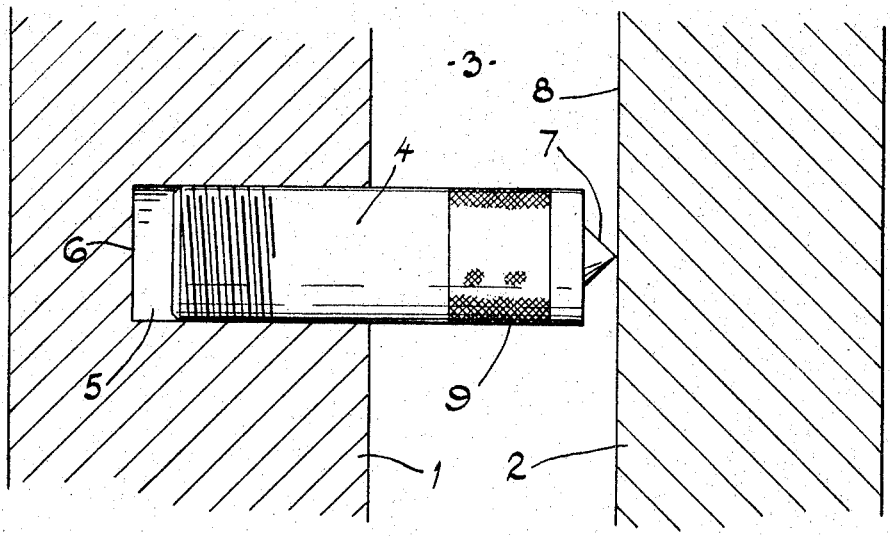

3,314,118
MOULDING TECHNIQUES
George Stanworth, 147 Wheatley Lane Road, Barrowford, Nelson, England
Filed Nov. 10, 1964, Ser. No. 410,152
1 Claim. (Cl. 22—203)

In moulding it is frequently the practice to mould an insert into the moulded article, and all that is required is some kind of support for the insert in the mould. Generally, the support also provides correct location for the insert relatively to the finished moulded article.

It sometimes happens that an insert is displaced on or in its support, and consequently it does not occupy the correct position in the moulded article, and a faulty moulding results. This fault is often corrected in pressure moulding by the pressure of the molten material acting on the insert, and forcing it back into its correct location. However, if the insert is so displaced that molten material cannot flow between the insert and the internal surface of the mould it may not be possible for the molten material to exert pressure in the required direction on the insert, and consequently, the displacement of the insert is not corrected. Even if the location of the insert is not very critical, it will be appreciated that if the insert breaks through the moulded material because it has been resting against a face of the mould, then a faulty moulding is usually formed.

The object of the invention is to provide a method of moulding inserts into moulded articles, by the use of which the danger of this particular fault is minimised.

According to this invention, a method of moulding an insert into a moulded article comprises forming the insert with a protuberance on a face which is to be facing an internal surface of the mould, whereby the insert cannot rest on that surface in a position which would prevent molten material flowing between itself and that surface during moulding, placing the insert in a mould and admitting molten material into the mould.

It will be appreciated, that the insert cannot move nearer to the internal surface of the mould than its protuberance will permit, so that at the worst, only the extremity of the protuberance could break through the molten material.

In a preferred method, the insert is seated in a location hole in the mould, the protuberance is formed on the opposite side of the insert to the base of the location hole, and the molten material is admitted under pressure. With this method, the protuberance will ensure that some molten material will flow between the insert and the internal surface of the mould—even if the insert has been so far displaced out of its location that the protuberance engages with the internal surface of the mould—and this molten material will exert pressure on the insert to press it back on to the base of its location hole.

There may be more than one protuberance formed on the insert, but in most instances a single protuberance will be sufficient. It will be understood that the invention may be applied to all kinds of moulding including casting metals and alloys and plastics moulding.

Many inerts are circular in cross-section (i.e. studs, posts and the like) and are turned in manufacture. Where an insert is turned, it is preferred to turn the protuberance on it.

A method of casting a stud into a pressure die casting will now be described by way of example only, with reference to the accompanying drawing, which is a section through part of a mould.

As shown in the drawing a mould has two portions 1 and 2, which together define the thickness of a portion 3 of the finished casting. (No particular castings is illustrated because the invention is applicable to any casting into which When the molten metal flows into the mould under pressure some of the metal which forms the portion 3 of the casting flows between the end face of the stud and the surface 8 of the mould, and the stud is forced by the pressure of this metal away from the surface 8 back into proper engagement with the base 6 of the hole 5. It will be clear that if the pip 7 were not provided, the end of the stud 4 could rest against the surface 8 and the molten metal would not then flow between that surface and the stud. This would result in the production of a faulty casting. However, the presence of the pip ensures that some molten metal must flow between the stud and the surface 8. Part of the stud which eventually is in the cast metal 3 is knurled as shown at 9 to help to prevent movement of the stud in the cast metal.

The invention can be applied in a variety of circumstances. For example, the protuberance could be formed on any side or face of an insert if that face is near to an internal surface of the mould and the insert can become displaced towards that surface. In the case of a large face on the insert, two or more protuberances may be provided.

I claim:

A method of locating an insert in a moulded article comprising preparing a mould with a first internal wall and a location for said insert in another internal wall, said location including an end location face for a first face of said insert, forming said insert with a protuberance on a second face oppositely directed to said first face, said second face facing said first internal wall of said mould when said insert is in said location, whereby said protuberance prevents said insert resting with its second face in such a position abutting said first internal wall which would prevent the flow of molten material between said insert and said first internal wall, and forcing molten material under pressure-diecasting pressure into said mould, so that said molten material pressing on said second face of said insert forces said insert into its location to engage said first face of said insert with said end location face.

References Cited by the Examiner

UNITED STATES PATENTS

| | | | |
|---|---|---|---|
| 457,021 | 8/1891 | Badger | 22—184 |
| 1,592,671 | 7/1926 | Nichols | 25—118 |
| 1,688,728 | 10/1928 | McWane | 22—184 |
| 2,163,814 | 6/1939 | Swarovski | 18—36 |
| 2,595,123 | 4/1952 | Callan | 25—118 |

FOREIGN PATENTS 18,051   12/1888   Great Britain.

J. SPENCER OVERHOLSER, *Primary Examiner.*
V. K. RISING, *Assistant Examiner.*